(12) United States Patent
McGregor et al.

(10) Patent No.: US 11,809,379 B2
(45) Date of Patent: Nov. 7, 2023

(54) STORAGE TIERING FOR DEDUPLICATED STORAGE ENVIRONMENTS

(71) Applicant: International Business Machines Corporation, Armonk, NY (US)

(72) Inventors: Harry R. McGregor, Tucson, AZ (US); Shazad Naviwala, Richmond, TX (US); Dessa Simpson, Tucson, AZ (US); Christopher B. Moore, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 16/688,019

(22) Filed: Nov. 19, 2019

(65) Prior Publication Data

US 2021/0149846 A1 May 20, 2021

(51) Int. Cl.
*G06F 16/17* (2019.01)
*G06F 16/174* (2019.01)
(Continued)

(52) U.S. Cl.
CPC ........ *G06F 16/1752* (2019.01); *G06F 3/0608* (2013.01); *G06F 3/0641* (2013.01);
(Continued)

(58) Field of Classification Search
CPC .. G06F 16/1752; G06F 3/0608; G06F 3/0641; G06F 3/0649; G06F 3/0685; G06F 16/152; G06F 16/174; G06F 2003/0697
See application file for complete search history.

(56) References Cited

U.S. PATENT DOCUMENTS 7,236,987 B1 6/2007 Faulkner et al.
7,567,188 B1 7/2009 Anglin et al.
(Continued)

FOREIGN PATENT DOCUMENTS

CN 103324699 B 3/2016

OTHER PUBLICATIONS

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

*Primary Examiner* — Pierre M Vital
*Assistant Examiner* — Cecile H Vo
(74) *Attorney, Agent, or Firm* — Mark Bergner (57) ABSTRACT

Embodiments of the present disclosure include a computer-implemented method, a computer program product, and a system for storing data based, at least partially, on the deduplication rates of a storage system within a storage environment. The computer-implemented method includes receiving data to be stored in a storage environment, computing a hash for the received data, and querying storage deduplication agents for statuses of storage systems within the storage environment. The computer-implemented method also includes receiving deduplication rates and hash tables relating to the storage systems from the storage deduplication agents. The computer-implemented method further includes analyzing stored data stored on the storage systems using the deduplication rates and the hash tables and comparing the stored data to the received data. The computer-implemented method further includes allocating the received data to a storage system within the storage environment based on the comparison of the stored data to the received data.

11 Claims, 5 Drawing Sheets

(51) Int. Cl.
*G06F 16/14* (2019.01)
*G06F 3/06* (2006.01)
(52) U.S. Cl.
CPC .......... *G06F 3/0649* (2013.01); *G06F 3/0685* (2013.01); *G06F 16/152* (2019.01)

(56) References Cited

U.S. PATENT DOCUMENTS

| | | | |
|---|---|---|---|
| 8,051,243 B2* | 11/2011 | Murase | G06F 3/0647 |
| | | | 711/170 |
| 8,442,956 B2 | 5/2013 | Tofano | |
| 8,639,669 B1* | 1/2014 | Douglis | G06F 3/061 |
| | | | 707/692 |
| 9,043,555 B1 | 5/2015 | Khona et al. | |
| 9,361,321 B1 | 6/2016 | Auchmoody et al. | |
| 9,703,796 B2 | 7/2017 | Kumar et al. | |
| 10,235,369 B2 | 3/2019 | Werner | |
| 2011/0231362 A1* | 9/2011 | Attarde | G06F 16/1752 |
| | | | 707/699 |
| 2012/0317084 A1 | 12/2012 | Liu | |
| 2015/0012495 A1* | 1/2015 | Prahlad | G06F 3/067 |
| | | | 707/640 |
| 2015/0019815 A1 | 1/2015 | Aronovich | |
| 2016/0253121 A1* | 9/2016 | Guo | G06F 3/0689 |
| | | | 711/117 |
| 2016/0366226 A1 | 12/2016 | Friedman et al. | |
| 2017/0115922 A1* | 4/2017 | Imaeda | G06F 3/0685 |
| 2017/0262232 A1 | 9/2017 | Zhao et al. | |
| 2018/0314435 A1 | 11/2018 | Wu et al. | |
| 2019/0226030 A1* | 7/2019 | Modlin | C12Q 1/6886 |

* cited by examiner

STORAGE TIERING FOR DEDUPLICATED STORAGE ENVIRONMENTS

BACKGROUND

The present disclosure relates to data storage, and more specifically, to dynamically managing deduplicated data within a tiered storage environment.

Data deduplication involves a process of identifying unique chunks of data, or byte patterns, and storing a signature of the chunk for reference when new data chunks are received. If the signature of a new chunk matches an existing signature, then the new chunk is replaced with a reference to the stored chunk having the same, or similar, signature. Byte patterns and data chunks having the same signature can frequently occur resulting in the amount of data stored being reduced by a significant amount.

Data deduplication is one form of data reduction that a storage environment can implement to optimize the capacity of the environment. Other techniques, such as tiered storage can optimize how data is stored within an environment. Tiered storage allocates data across different tiers, or types, of storage devices and media. Data can be allocated to a specific tier according to performance and capacity requirements the data may have.

SUMMARY

Embodiments of the present disclosure include a computer-implemented method for storing data based, at least partially, on the deduplication rates of a storage system within a storage environment. The computer-implemented method includes receiving data to be stored in a storage environment, computing a hash for the received data, and querying storage deduplication agents for storage analytics of storage systems within the storage environment. The computer-implemented method also includes receiving the storage analytics relating to the storage systems from the storage deduplication agents. The computer-implemented method further includes analyzing stored data stored on the storage systems using the storage analytics and comparing the stored data to the received data. The computer-implemented method further includes allocating the received data to a storage system within the storage environment based on the comparison of the stored data to the received data.

Additional embodiments are directed to a computer program product for storing data based, at least partially, on the deduplication rates of a storage system within a storage environment, which can include a computer readable storage medium having program instructions therewith, the program instructions executable by a processor to cause the processor to perform a method. The method includes receiving data to be stored in a storage environment, computing a hash for the received data, and querying storage deduplication agents for storage analytics of storage systems within the storage environment. The method also includes receiving deduplication rates and hash tables relating to the storage systems from the storage deduplication agents. The method further includes analyzing stored data stored on the storage systems using the deduplication rates and the hash tables and comparing the stored data to the received data. The method further includes allocating the received data to a storage system within the storage environment based on the comparison of the stored data to the received data.

Further embodiments are directed to a deduplication management system for storing data based, at least partially, on the deduplication rates of a storage system within a storage environment. The deduplication management system is configured to receive data to be stored in a storage environment, compute a hash for the received data, and query storage deduplication agents for storage analytics of the storage systems within the storage environment. The storage analytics include hash tables and, in some embodiments, deduplication rates, for the data stored on the storage systems. The deduplication management system is further configured to receive the storage analytics from the deduplication agents. The hash relating to the received data is compared to the hash tables received and a storage system is determined on which to store the receive data. Once determined, the received data is stored on the storage system.

BRIEF DESCRIPTION OF THE DRAWINGS

These and other features, aspects, and advantages of the embodiments of the disclosure will become better understood with regard to the following description, appended claims, and accompanying drawings where:

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to data storage, and more specifically, to dynamically managing deduplicated data within a tiered storage environment. While not limited to such applications, various aspects of the disclosure may be appreciated through a discussion of various examples using this context.

Data reduction technology increases the capacity of existing storage environments by employing efficiency functions and reducing storage costs. Deduplication, as well as other forms of data reduction, is a type of data reduction technology that can be implemented within multiple components of a storage environment. Deduplication is a method of consolidating redundant copies of a file or file subcomponents. Incoming or existing data are standardized into chunks that can then be examined for redundancy. If a redundancy exists, pointers can be put in place to reference a single copy of the chunk and any extraneous duplicates can be released.

Incoming or existing data can be split into chunks by a process known as chunking. Chunking refers to dividing data into standardized units that can be examined for duplicates. These units can be files or more granular components such as blocks. Each chunk is processed using a parity calculation or cryptographic hash function. This processing gives the chunks identifiers known as hash values, digital signatures, or fingerprints. These identifiers can be stored in an index or catalog where they can be compared quickly with other identifiers to find matching chunks. To determine an identifier for each chunk, methods such as hashing, binary comparison, or delta differencing can be implemented.

Once duplicate chunks have been determined and identified, pointers to those chunks can be changed so they point to a single unique copy rather than multiple duplicate chunks. Once the pointers are changed such that they point to the unique copy, the other chunks can be released to save physical disk storage.

Storage environments, such as those over a local area network (LAN) or storage area network (SAN), can include a multitude of storage systems of varying capabilities. These storage systems may have capabilities such as data reduction (e.g., deduplication, compression), storage tiering, redundant array of independent disks (RAID), and the like. Other storage systems may simply store fully allocated volumes.

Limitations on efficiency remain in storage environments with varying storage systems. For example, there is no mechanism to allocate data storage with common data between different storage systems. Also, optimizing deduplication commonality when large datasets existing across a vast estate of storage systems within a storage environment is not possible. Also, storage tiering algorithms are based on the performance capabilities of a storage system and the performance requirements for the data being stored. These algorithms can be inefficient when used in conjunction with deduplicated backend storage.

Embodiments of the present disclosure may overcome the above, and other, problems by using a deduplication management system. The deduplication management system can be configured to detect deduplicated data across an entire storage environment. Once detected, the deduplication management system can consolidate the deduplicated into a storage system capable of managing the deduplicated data. Also, the deduplication management system is further configured to receive incoming data and analyze the data across the storage environment to determine an appropriate storage system to store the data. Similarly, the deduplication management system can be configured to monitor the deduplication rates of the storage systems and determine whether changes have occurred to the data that is affecting the deduplication of the data. If detected, the deduplication management system can be configured to migrate data to another storage system designed to efficiently store the data.

More specifically, the deduplication management system described herein operates within a storage environment that includes storages systems of varying capabilities. In other words, data is stored, at least partially, on a storage system based on the deduplication possibilities of the data and the storage system. Accordingly, data which can be deduplicated can be stored within a storage system containing similar data having deduplication functionalities. Similarly, data which is unique can be stored on storage systems maintaining other unique data and may not necessarily have deduplication functionalities.

By way of example, a company having multiple identical virtual desktops are being deduplicated on a storage system. An administrator within the company alters the virtual desktops such that each virtual desktop is encrypted with a unique key. Typically, encryption removes data redundancy. As a result, the encrypted virtual desktops yield extremely low deduplication rates, if any. As such, each virtual desktop is now being stored independently of each other which increases the storage requirements for the storage system. The deduplication management system can monitor the storage system and recognize that the deduplication rate of the storage system has decreased. The data which is no longer being deduplicated can be detected (e.g., the virtual desktops) and migrated to a storage system with a larger storage capacity and configured to maintain such data. This prevents the original storage system from exceeding its storage capacity and allowing it to maintain storage suitable to its capabilities.

Additionally, or alternatively, the company may want to store additional data into a storage system. The deduplication management system can analyze the data to be stored by chunking the data and determining the hash for those chunks. The hashes can be compared to other hashes for data stored across the storage environment maintained by the company. Upon detecting a similar hash, the additional data can be stored in a storage system with the already stored similar data. This allows the storage system to deduplicate the data and save storage capacity.

In some embodiments, the deduplication management system is provided deduplication rates as part of the storage analytics received by the deduplication agents operating on the storage systems. Deduplication rates provide an aggregate reduction in storage requirements gained from data that has been deduplicated on the storage system. In some embodiments, the deduplication management system is provided deduplication ratios as part of the storage analytics received by the deduplication agents operating on the storage systems. Deduplication ratio is the measurement of the original size of data versus the size of data after removing redundancy. Deduplication ratios can be calculated by dividing the total capacity of backed up data before releasing duplicates by the actual capacity used after the backup is complete.

Embodiments of the present disclosure include factoring storage tiering when allocating the received data. For example, the received data may perform better when stored on a flash-based system as opposed to disk storage or a tape library. As such, the deduplication management system can determine the performance requirement for the received data as well as analyze the performance capabilities of the storage systems within the storage environment. The received data can be then be allocated to a storage system based on the hash similarities of the received data to data stored on the storage systems as well the performance requirements of the received data and the performance capabilities of the storage systems.

Embodiments of the present disclosure further include monitoring the deduplication performance of the storage systems across the storage environment. For example, a storage system may have deduplication capabilities and is deduplicating at a consistent rate for that system. The deduplication management system can monitor for any changes in that system such as a degradation in deduplication rates. As such, the deduplication management system can be configured to query the deduplication agents for storage analytics. The analytics can be used to detect a performance degradation relating storage capacity from at least one storage system. The storage system can be analyzed to calculate unduplicated data stored within the storage system that may have been previously stored as duplicated data. A different storage system can be determined that is within the storage environment that is better suited to maintain the unduplicated data. Once determined, the deduplication management system can migrate the unduplicated data to the different storage system.

For example, a storage system may have been storing identical virtual desktops which deduplicated efficiently. However, the virtual desktops have become encrypted which changes the hashes of the virtual desktop. Due to the change in hash, the storage system is now storing the virtual desktops separately. The deduplication management system can detect the change and migrate the virtual desktops to a storage system best suited to store the data.

Embodiments of the present disclosure further include reorganizing stored data based on hash similarities of data stored across a storage environment. For example, if hashes exist across various storage systems in a storage environment that are similar, then grouping those hashes together can potentially increase storage efficiency. As such, the deduplication management system can be configured to query deduplication agents operating on the storage systems for storage analytics relating to the storage systems on which the deduplication agents operate. The deduplication management system can be further configured to receive the deduplication analytics which can contain hash tables relating to deduplicated data stored on the storage systems. Once received, the deduplication management system can analyze the hash table to determine similarities between stored data across the storage environment. Similar data can be detected based on the hash tables stored in separate storage systems and the similar data can be migrated to one storage system to be maintained. By migrating the similar data, the storage system can reduce the overall storage requirements by deduplicating the similar data.

In some embodiments, the deduplication management system calculates deduplication rates for each of the storage systems within a storage environment based on the hash tables received from a storage deduplication agent.

It is to be understood that the aforementioned advantages are example advantages and should not be construed as limiting. Embodiments of the present disclosure can contain all, some, or none of the aforementioned advantages while remaining within the spirit and scope of the present disclosure.

Figure 1:
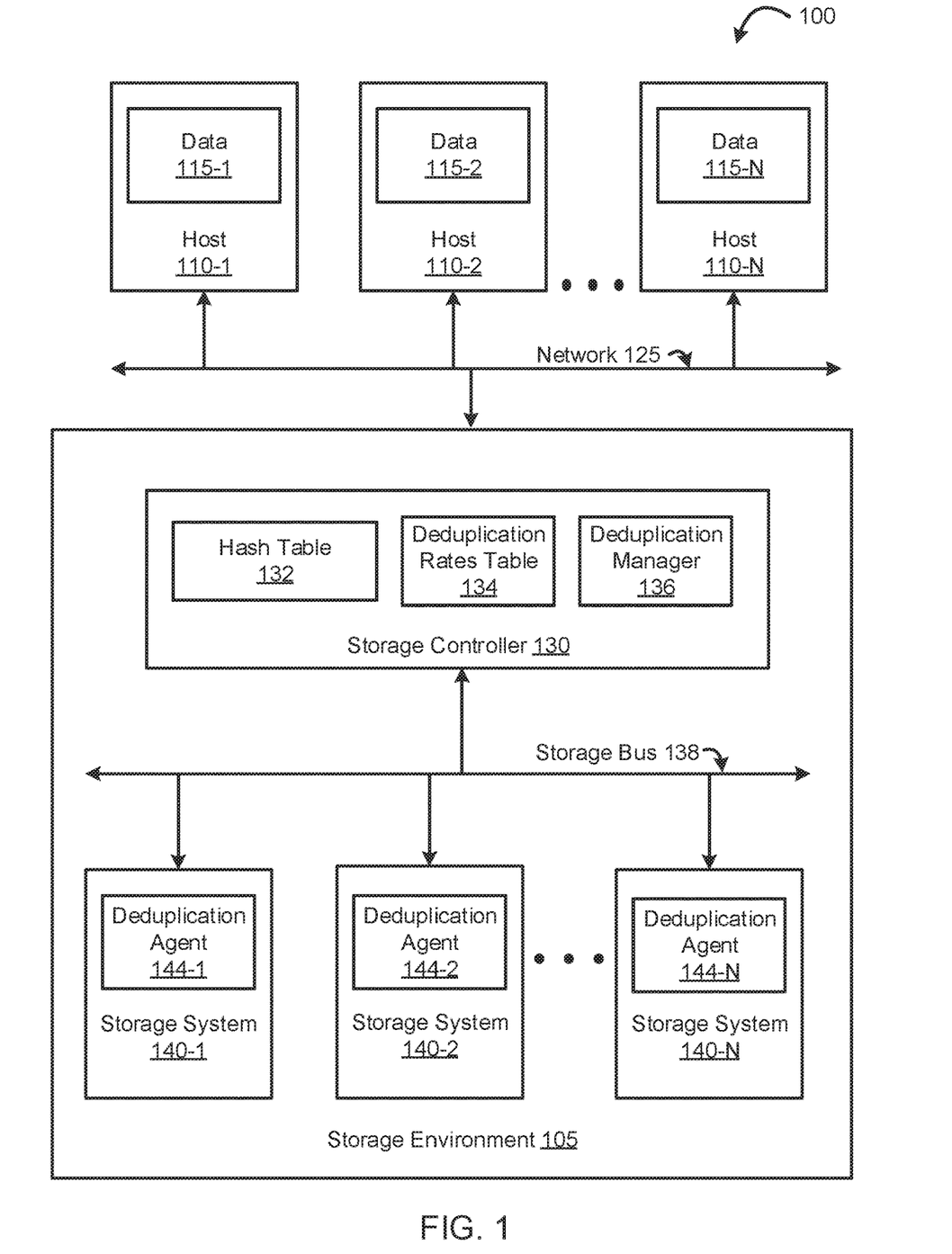
FIG. 1 is a block diagram illustrating a deduplication management system within a storage environment, in accordance with embodiments of the present disclosure.

FIG. 1 is a block diagram illustrating a deduplication management system 100 for managing deduplication, in accordance with embodiments of the present disclosure. The deduplication management system 100 includes, a storage environment 105, one or more hosts 110-1, 110-2, 110-N (collectively "host 110"), where N is a variable integer representing any number of possible hosts 110, with data 115-1, 115-2, 115-N (collectively "data 115"), and a network 125. The storage environment 105 includes a storage controller 130, a storage bus 138, and storage system 140-1, 140-2, 140-N (collectively "storage systems 140"). The storage controller 130 is communicatively coupled with the storage systems 140 over the storage bus 138. In some embodiments, the storage controller 130 includes a hash table 132, a deduplication rates table 134, and a deduplication manager 136. The storage systems 140 includes a deduplication agent 144-1, 144-2, 144-N (collectively "deduplication agents 144"), respectively.

The storage environment 105 is a component of the migration system 100 configured to consolidate, manage, and operate data storage. In some embodiments, the storage environment 105 is a server or an aggregation of servers. Examples of the storage environment 105 include storage servers (e.g., block-based storage), direct attached storage, file servers, server-attached storage, network-attached storage, or any other storage solution. In some embodiments, the components of the storage environment 105 are implemented within a single device. In some other embodiments, the components of the storage environment 105 comprise of a distributed architecture. For example, the storage environment 105 can comprise of multiple storage systems 140 physically located at different locations but are able to communicate over a communication network to achieve a desired result.

The host 110 is a component of the deduplication management system 100 configured to provide data 115 and commands to the storage environment 105. In some embodiments, the host 110 is a server (e.g., WINDOWS, Power Systems, IBM I, UNIX, System Z), a personal computer (e.g., desktop, laptop, tablet), or any device capable of communicating over a network and provide data 115. The host 110 can send command to the storage environment to manipulate the data 115. The data 115 can be manipulated in a variety of ways such as reading, writing, deleting, and moving the data 115.

The network 125 is a component of the deduplication management system 100 configured to facilitate direct, high-speed data transfers and communication between the host 110 and the storage environment 105. In some embodiments, the network 125 is an internal bus. In some embodiments, the network 125 is an external bus. Examples of the network 125 include a local area network (LAN), a wide area network (WAN), a storage area network (SAN), intranet, or any combination thereof.

The storage controller 130 is a component of the storage environment 105 configured to manage the input and output of data from the network 125 to the storage system 140. Data can be stored and manipulated depending on the needs of the storage environment 105. In some embodiments, the storage controller 130 arranges and configures storage devices within the storage systems 140 in a redundant array of independent disks (RAID) configuration. For example, data stored within the storage environment 105 can be striped across all configured storage devices and possibly across the storage systems 140. Various RAID configurations also offer techniques such as striping, mirroring, and providing parity bits.

The storage controller 130 is further configured to manage how the data, received by the storage environment 105, is stored and retrieved. For example, in tier-based storage configuration, data is placed in a storage system 140 best suited for the type of data that is received.

The hash table 132 is a component of the storage controller 130 configured to store hashes of deduplicated data stored on each of the storage systems 140. While shown in FIG. 1 as a table, the hash table 132 can be a mapping, database, journal, metadata, and the like. The hash table 132 can include information that provides the storage controller 130 with pointer information for the deduplicated data stored on each of the storage systems 140. In some embodiments, the hash table 132 includes the size of the data, the location of the data, the type of data, and the read speed of the storage system that is storing the data.

The deduplication rates table 134 is a component of the storage controller 130 configured to store deduplication rates of each of the storage system 140. While shown in FIG. 1 as a table, the deduplication rates table 134 can be a mapping, database, journal, metadata, and the like. The deduplication rates table can include information that provides the storage controller 130 with current deduplication rates. The deduplication rate represents the aggregate reduction in storage requirements gained from deduplication. Numerous factors can impact the deduplication rate as redundancy can vary by application, frequency of version capture, and retention policy. These factors include rate of data change, frequency of backups, retention periods, the size of data, and the like. As deduplication rates increase, a reduction in storage requirements occurs as deduplicated data is released. Conversely, as deduplication rates decrease, an increase in storage requirements occurs as less data is deduplicated and released.

The deduplication manager 136 is a component of the storage controller 130 configured to query the deduplication agents 144 for hash information and deduplication rates for each of the storage systems 140. The deduplication manager 136 is further configured to update the hash table 132 and deduplication rates table 134 upon receiving information from the deduplication agents 144.

The storage bus 138 is a component of storage environment 105 configured to facilitate direct, high-speed transfer and communication between the storage systems 140, either directly or through the storage controller 130. In some embodiments, the storage bus 138 is an internal bus. In some embodiments, the storage bus 138 is an external bus. In some embodiments, the storage bus 138 enables data to be moved without server intervention, therefore freeing up processing cycles on the server end. For example, a disk device can back up its data to a tape device as needed without receiving a command from a server or controller. Examples of the storage bus 138 include a LAN, a WAN, a Fibre Channel (FC), and any combination thereof. In some embodiments, implementations interconnect together into many network configurations capable of communicating over long distances. The storage bus 138 is configured to transfer data utilizing a variety of standards. Some standards include the Small Computer System Interface (SCSI), Fibre Channel, fiber connection (FICON), and Internet Protocol (IP) standards.

The storage systems 140 are components of storage environment 105 configured to store and manage the input and output of data on the storage environment 105. Examples of storage systems 140 include tape systems (e.g., tape drives, tape autoloaders, tape libraries), disk systems, flash systems, hybrid systems, storage arrays, magnetic drives, solid-state drives, and optical drives. In some embodiments, the storage systems 140 include storage efficiency solutions such as real-time compression, automated tiering, virtualization, and thin provisioning.

The deduplication agents 144 are components of the storage systems 140 configured to provide the deduplication manager 136 with hash information and deduplication rates for the storage systems 140 on which the deduplication agents 144 operate. In some embodiments, the deduplication agents 144 monitor the hash information and deduplication rates. Upon determining a change, the deduplication agents 144 can report the changes to the deduplication manager 136. In some embodiments, a threshold can be set to the deduplication rates for the storage systems 140. Upon reaching the threshold, the deduplication agent 144 can report the changes to the deduplication manager 136. For example, a threshold for deduplication rates that drop below 50% can be set. If a storage system 140 drops below that threshold, then the deduplication agent 144 can report to the deduplication manager 136.

In some embodiments, the functions of the deduplication agents 144 are performed by the storage controller 130. For example, the storage controller 130 can retrieve the hash information directly from each of the storage systems 140 and compute the deduplication rates for those storage systems 140 based on the hash information.

It is noted that FIG. 1 is intended to depict the representative major components of an exemplary deduplication management system 100. In some embodiments, however, individual components may have greater or lesser complexity than as represented in FIG. 1, components other than or in addition to those shown in FIG. 1 may be present, and the number, type, and configuration of such components may vary.

Figure 2:
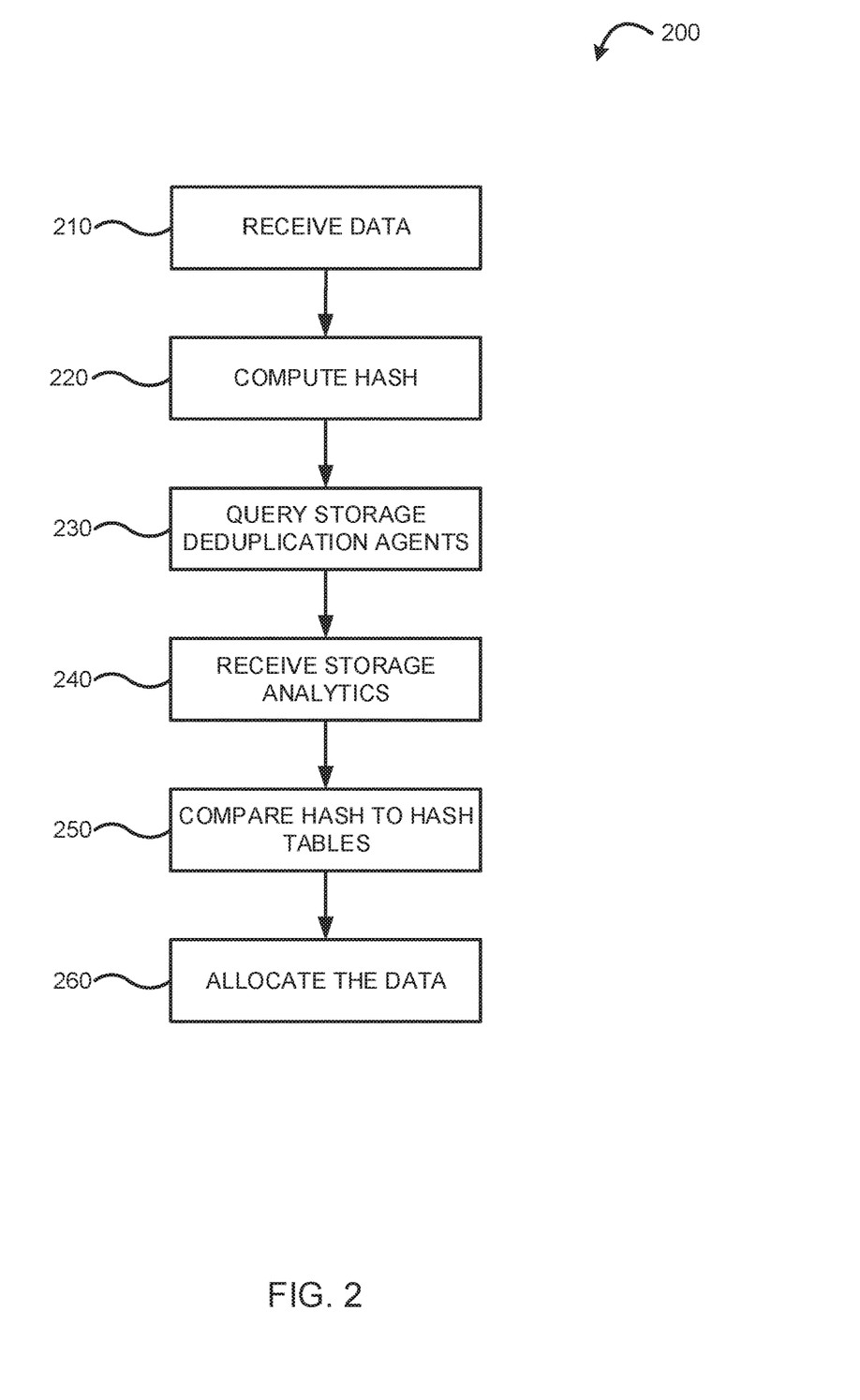
FIG. 2 is a flow chart of a deduplication management process, in accordance with embodiments of the present disclosure.

FIG. 2 illustrates a flow diagram of a process 200 for deduplication management based on storage analytics on a deduplication management system such as, for example, deduplication management system 100 described above with reference to FIG. 1, in accordance with embodiments of the present disclosure. The process 200 may be performed by hardware, firmware, software executing on a processor, or ay combination thereof. For example, any or all of the steps of the process 200 may be performed by one or more processors embedded in computer system 300 or performed by a cloud computing environment 400.

The process 200 begins by the deduplication management system 100 receiving data to be stored in the storage environment 105. This is illustrated at step 210. In some embodiments, the data is transmitted by a host 110 to the storage environment 105 for storing. The data can be various types of data such as structured data, unstructured data, and semi-structured data. Structured data refers to data that is organized in a predetermined arrangement. For example, structured data can be data that is stored in a database. Structured data typically includes data whose patterns make them easily searchable. For example, data organized in fields of a relational or object-oriented database. Unstructured data refers to data that does not have readily discernible organization. For example, data such as audio, video, and text documents. Most data can typically be considered unstructured data.

The storage controller 130 computes a hash relating to the received data. This is illustrated at step 220. A hash is calculated by chunking the received data into chunks which divides the data into standardized units that can be examined for duplicates. Each chunk is processed using a parity calculation or cryptographic hash function.

In some embodiments, the hash is calculated using post-process deduplication. In post-process deduplication, the received data is first stored on a storage system and then a hash is created to look for deduplication. In some embodiments, the hash is calculated using in-line deduplication. In in-line deduplication, the hash is calculated as the data enters the storage environment. If the deduplication management system 100 identifies a block which it has already stored, only a reference to the existing block is stored, rather than a new block.

The deduplication manager 136 queries deduplication agents 144 for storage analytics pertaining to the storage systems 140 within the storage environment 105. This is illustrated at step 230. In some embodiments, the deduplication manager 136 queries the deduplication agents 144 at a predetermined interval. For example, the deduplication manager 136 may query the deduplication agents 144 every thirty minutes or every hour. The intervals can also be shorter or longer depending on the amount of data being stored within the storage environment. In some embodiments, the deduplication manager 136 queries the deduplication agents 144 upon receiving data to be stored. In some embodiments, the deduplication manager 136 queries the deduplication agents 144 during times of low traffic so as not to interrupt the performance of the storage environment.

The deduplication manager 136 receives storage analytics from each of the storage systems providing such information. This is illustrated at step 240. The storage analytics can include information such as the hash tables for the deduplicated data, deduplication rates, deduplication ratios, as well as other storage system related information. The deduplication manager 136 can store the hash tables within hash table 132 and the deduplication rates within the deduplication rates table 134. By storing the hash tables and the deduplication rates, the deduplication management system can analyze the historical performance of the storage system to monitor for any changes that may occur.

The deduplication management system 100 compares the hash for the received data with the hash tables received from the deduplication agents 144. This is illustrated at step 250. A computed hash, such as MD-5, SHA-1, SHA-2, is compared to hashes existing in data and stored in the hash tables. An identical hash can indicate that the data is most likely identical. In some embodiments, a binary comparison is used in place of a hash comparison. In a binary comparison, the deduplication management system 100 compares all bytes of similar chunks. In some embodiments, a delta differencing technique is used to compare chunks. In delta differencing, a delta between two similar chunks is computed where one chunk is the baseline and the second chunk is the delta. Because each delta is unique, collisions are avoided.

In some embodiments, the hash is identical to a hash stored in the hash tables but reference non-unique chunks resulting in a hash collision. A secondary comparison can be performed to verify that the hash-based duplicate chunks are redundant before consolidating the chunks.

Once a comparison is performed, the received data is allocated onto a storage system based on the comparison performed. This is illustrated at step 260. In some embodiments, the storage system selected for allocation contains an identical hash as the hash for the received data. By having an identical hash, the storage system can deduplicate the received data and reduce the storage requirements for the system. In some embodiments, the comparison determined that the hash is unique from the other hashes found in the hash tables. A storage system configured to store unique data can be selected as the source of the allocation.

Figure 3:
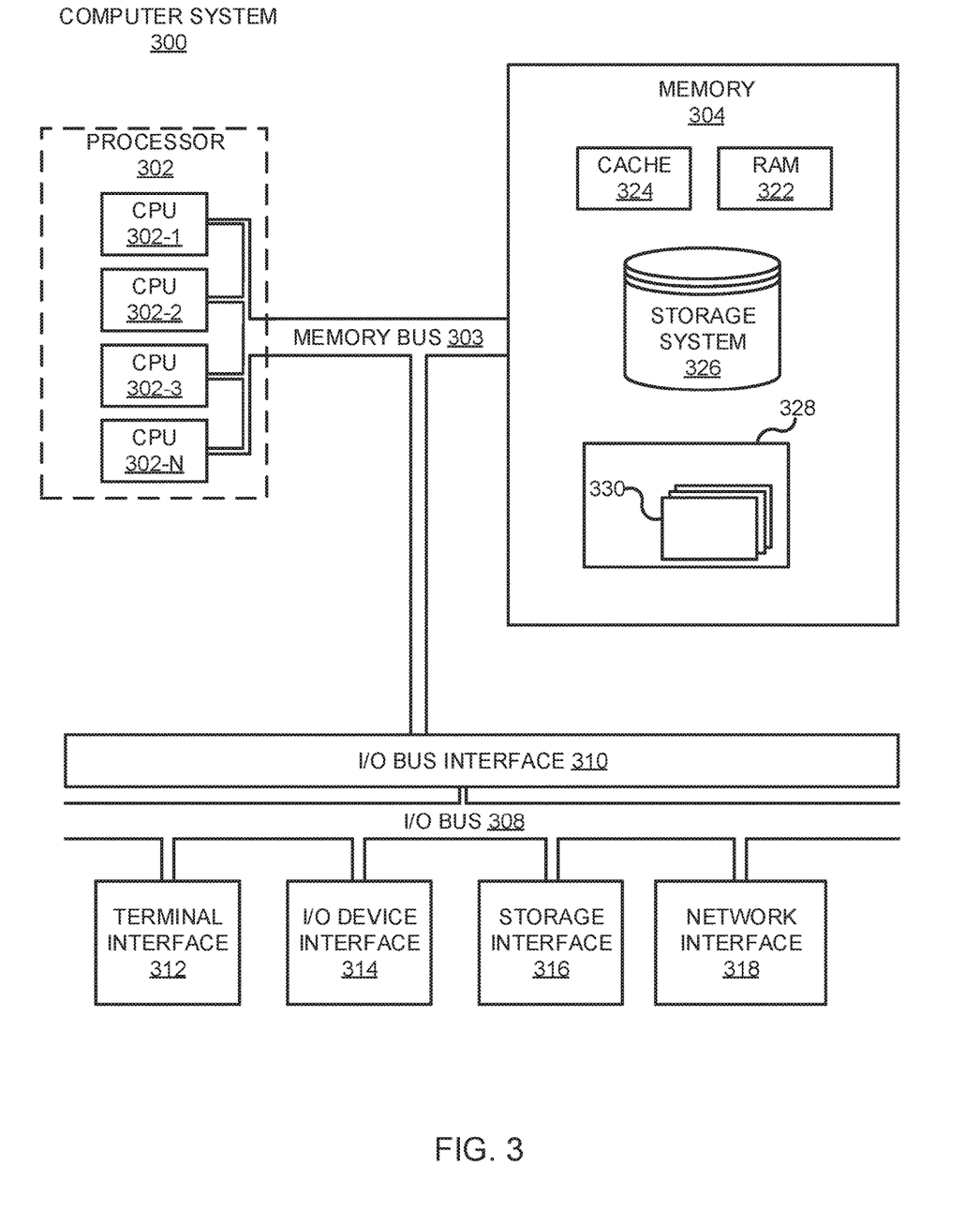
FIG. 3 is a high-level block diagram illustrating an example computer system that may be used in implementing one or more of the methods, tools, and modules, and any related functions, described herein, in accordance with embodiments of the present disclosure.

Referring now to FIG. 3, shown is a high-level block diagram of an example computer system 300 (e.g., the deduplication management system 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 300 may comprise one or more processors 302, a memory 304, a terminal interface 312, a I/O (Input/Output) device interface 314, a storage interface 316, and a network interface 318, all of which may be communicatively coupled, directly or indirectly, for inter-component communication via a memory bus 303, a I/O bus 308, and an I/O bus interface 310.

The computer system 300 may contain one or more general-purpose programmable central processing units (CPUs) 302-1, 302-2, 302-3, and 302-N, herein generically referred to as the processor 302. In some embodiments, the computer system 300 may contain multiple processors typical of a relatively large system; however, in other embodiments the computer system 300 may alternatively be a single CPU system. Each processor 301 may execute instructions stored in the memory 304 and may include one or more levels of on-board cache.

The memory 304 may include computer system readable media in the form of volatile memory, such as random-access memory (RAM) 322 or cache memory 324. Computer system 300 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

Although the memory bus 303 is shown in FIG. 3 as a single bus structure providing a direct communication path among the processors 302, the memory 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 300 may, in some embodiments, contain multiple I/O bus interface units, multiple I/O buses, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 300 may be a multi-user mainframe computer system, a single-user system, or a server computer or similar device that has little or no direct user interface, but receives requests from other computer systems (clients). Further, in some embodiments, the computer system 300 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 300. In some embodiments, however, individual components may have greater or lesser complexity than as represented in FIG. 3, components other than or in addition to those shown in FIG. 3 may be present, and the number, type, and configuration of such components may vary.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
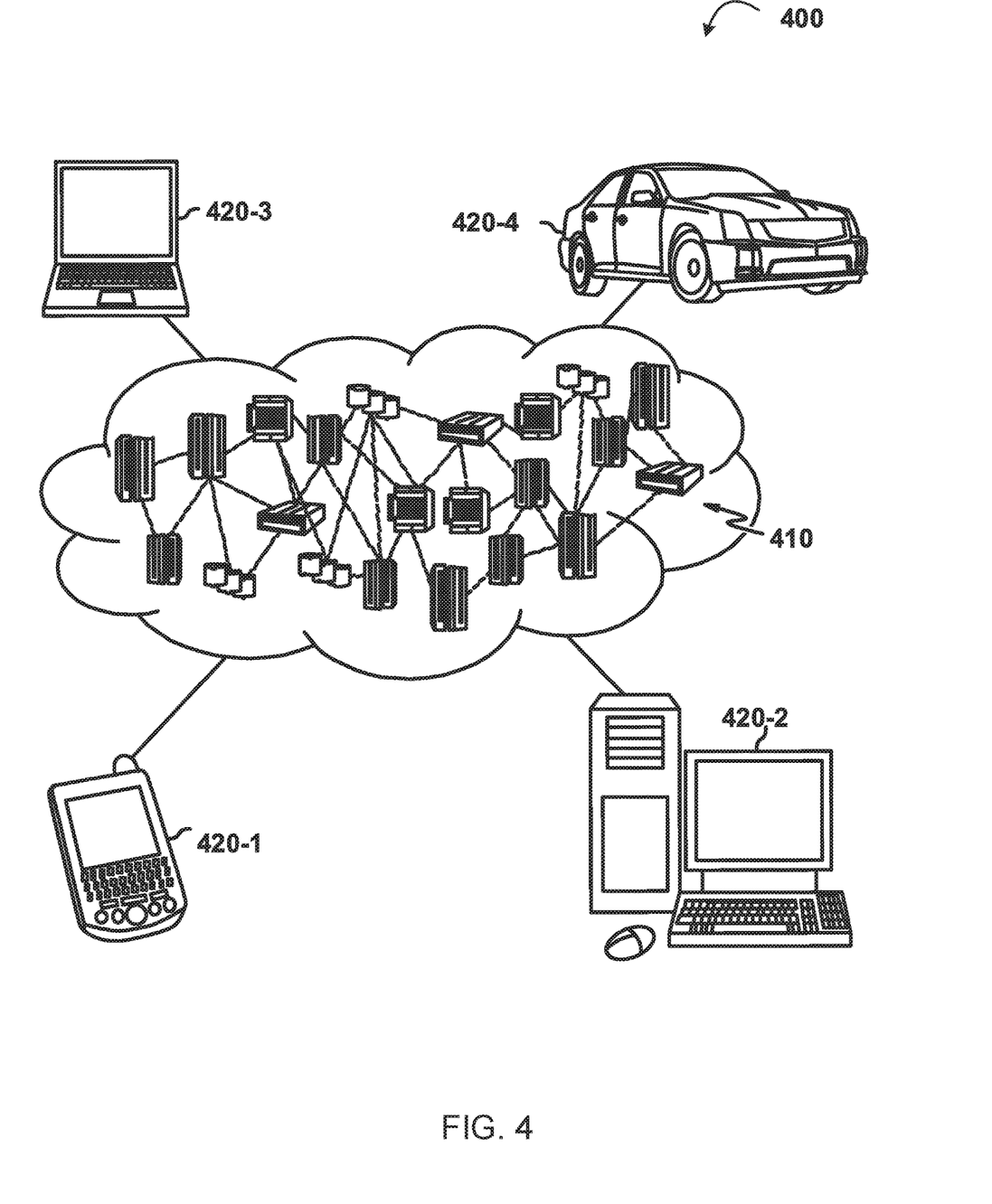
FIG. 4 depicts a cloud computing environment, in accordance with embodiments of the present disclosure.

Referring now to FIG. 4, illustrative cloud computing environment 400 is depicted. As shown, cloud computing environment 400 includes one or more cloud computing nodes 410 with which local computing devices used by cloud consumers, such as, for example, personal digital assistant (PDA) or cellular telephone 420-1, desktop computer 420-2, laptop computer 420-3, and/or automobile computer system 420-4 may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 420-1 to 420-4 shown in FIG. 4 are intended to be illustrative only and that computing nodes 10 and cloud computing environment 400 can communicate with any type of computerized device over any type of network and/or network addressable connection (e.g., using a web browser).

Figure 5:
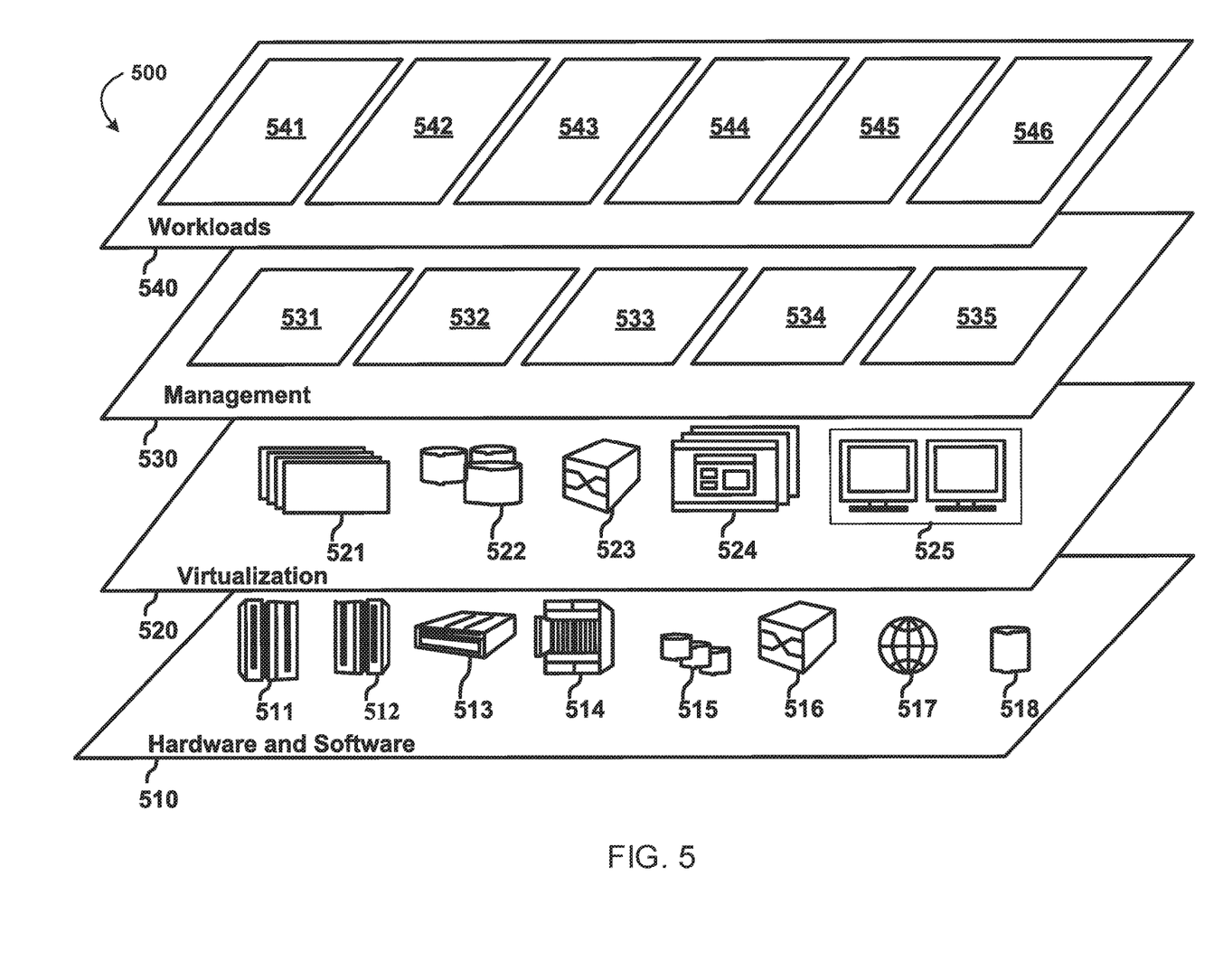
FIG. 5 depicts abstraction model layers, in accordance with embodiments of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include: mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 may provide the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment may be utilized. Examples of workloads and functions which may be provided from this layer include: mapping and navigation 541; software development and lifecycle management 542; virtual classroom education delivery 543; data analytics processing 544; transaction processing 545; and deduplication management 546 (e.g., the deduplication management system 100).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving data to be stored in a storage environment;
   computing a hash relating to the received data;
   querying storage deduplication agents for storage analytics from storage systems within the storage environment;
   receiving the storage analytics from the storage deduplication agents, wherein the storage analytics include hash tables for the storage systems containing deduplicated data;
   comparing the hash to the hash tables to detect similarities;
   determining a performance requirement related to deduplication rates for a storage tier for the received data, wherein the determining comprises determining when the storage tier is a flash-based system, a disk storage system, and a tape library system;
   analyzing performance capabilities relating to the storage systems for the storage tier by relating, to the storage tier, a media type selected from the group consisting of flash-based, disk, and tape;
   monitoring deduplication performance analytics relating to the deduplication rates of the storage systems for the storage tier;
   allocating the received data to the storage system based on the similarities relating to the hash and the hash table, the performance requirement for the received data, and the performance capabilities relating to the storage systems to optimize the available storage capacity within the storage systems;
   detecting a performance degradation relating to storage capacity from at least one storage system based on the storage analytics received;
   calculating unduplicated data within the at least one storage system;
   determining a different storage system within the storage environment to migrate the unduplicated data onto;
   migrating the unduplicated data to the different storage system;
   analyzing the hash tables to determine similarities between stored data across the storage environment;
   detecting similar data based on the hash tables stored in separate storage systems; and
   migrating the similar data to one storage system.

2. The computer-implemented method of claim 1, wherein the storage analytics further include deduplication rates for the storage systems containing the deduplicated data.

3. The computer-implemented method of claim 1, wherein determining the different storage system comprises:
   determining performance capabilities for the storage systems; and
   selecting the different storage system based on the performance capabilities and the unduplicated data.

4. The computer-implemented method of claim 1, further comprising calculating deduplication rates for each of the storage systems based on the hash tables received from the storage deduplication agents.

5. A computer program product comprising a computer readable storage medium having program instructions embodied therewith, the program instructions executable by a processor to cause the processor to perform a method comprising:
   receiving data to be stored in a storage environment;
   computing a hash relating to the received data;
   querying storage deduplication agents for storage analytics from storage systems within the storage environment;
   receiving the storage analytics from the storage deduplication agents, wherein the storage analytics include hash tables for the storage systems containing deduplicated data;
   comparing the hash to the hash tables to detect similarities;
   determining a performance requirement related to deduplication rates for a storage tier for the received data, wherein the determining comprises determining when the storage tier is a flash-based system, a disk storage system, and a tape library system;
   analyzing performance capabilities relating to the storage systems for the storage tier by relating, to the storage tier, a media type selected from the group consisting of flash-based, disk, and tape;
   monitoring deduplication performance analytics relating to the deduplication rates of the storage systems for the storage tier;

allocating the received data to the storage system based on the similarities relating to the hash and the hash table, the performance requirement for the received data, and the performance capabilities relating to the storage systems to optimize the available storage capacity within the storage systems;

detecting a performance degradation relating to storage capacity from at least one storage system based on the storage analytics received;

calculating unduplicated data within the at least one storage system;

determining a different storage system within the storage environment to migrate the unduplicated data onto;

migrating the unduplicated data to the different storage system;

analyzing the hash tables to determine similarities between stored data across the storage environment;

detecting similar data based on the hash tables stored in separate storage systems; and migrating the similar data to one storage system.

6. The computer program product of claim 5, wherein the storage analytics further include deduplication rates for the storage systems containing the deduplicated data.

7. The computer program product of claim 5, wherein determining the different storage system comprises:
   determining performance capabilities for the storage systems; and
   selecting the different storage system based on the performance capabilities and the unduplicated data.

8. The computer program product of claim 5, further comprising calculating deduplication rates for each of the storage systems based on the hash tables received from the storage deduplication agents.

9. A system comprising:
   a memory storing program instructions; and
   a processor, wherein the processor is configured to execute the program instructions to perform a method comprising:
      receiving data to be stored in a storage environment;
      computing a hash relating to the received data;
      querying storage deduplication agents for storage analytics from storage systems within the storage environment;
      receiving the storage analytics from the storage deduplication agents, wherein the storage analytics include hash tables for the storage systems containing deduplicated data;
      comparing the hash to the hash tables to detect similarities; determining a performance requirement for the received data;
      determining a performance requirement related to deduplication rates for a storage tier for the received data, wherein the determining comprises determining when the storage tier is a flash-based system, a disk storage system, and a tape library system;
      analyzing performance capabilities relating to the storage systems for the storage tier by relating, to the storage tier, a media type selected from the group consisting of flash-based, disk, and tape;
      monitoring deduplication performance analytics relating to the deduplication rates of the storage systems for the storage tier;
      allocating the received data to the storage system based on the similarities relating to the hash and the hash table, the performance requirement for the received data, and the performance capabilities relating to the storage systems to optimize the available storage capacity within the storage systems;
      detecting a performance degradation relating to storage capacity from at least one storage system based on the storage analytics received;
      calculating unduplicated data within the at least one storage system;
      determining a different storage system within the storage environment to migrate the unduplicated data onto;
      migrating the unduplicated data to the different storage system;
      analyzing the hash tables to determine similarities between stored data across the storage environment;
      detecting similar data based on the hash tables stored in separate storage systems; and
      migrating the similar data to one storage system.

10. The system of claim 9, wherein the storage analytics further include deduplication rates for the storage systems containing the deduplicated data.

11. The system of claim 9, wherein determining the different storage system comprises:
   determining performance capabilities for the storage systems; and
   selecting the different storage system based on the performance capabilities and the unduplicated data.

* * * * *